(12) United States Patent
Woo et al.

(10) Patent No.: US 10,738,966 B2
(45) Date of Patent: Aug. 11, 2020

(54) LIGHT DIFFUSION LENS

(71) Applicant: HLOPTICS CO., LTD., Hwaseong-si (KR)

(72) Inventors: Ji Hun Woo, Pyeongtaek-si (KR); Seok Chae Ko, Suwon-si (KR)

(73) Assignee: HLOPTICS CO. LTD., Hwaseong-si, Gyeonggi-Do (KR)

(*) Notice: Subject to any disclaimer, the term of this patent is extended or adjusted under 35 U.S.C. 154(b) by 0 days.

(21) Appl. No.: 16/301,440

(22) PCT Filed: Feb. 23, 2018

(86) PCT No.: PCT/KR2018/002248
§ 371 (c)(1),
(2) Date: Nov. 13, 2018

(87) PCT Pub. No.: WO2018/194255
PCT Pub. Date: Oct. 25, 2018

(65) Prior Publication Data
US 2019/0178467 A1 Jun. 13, 2019

(30) Foreign Application Priority Data
Apr. 21, 2017 (KR) .................. 10-2017-0051420

(51) Int. Cl.
*F21V 3/04* (2018.01)
*F21V 5/04* (2006.01)
(Continued)

(52) U.S. Cl.
CPC .............. *F21V 3/049* (2013.01); *F21V 5/04* (2013.01); *G02B 1/041* (2013.01);
(Continued)

(58) Field of Classification Search
CPC .................. F21V 5/048; F21V 3/049
See application file for complete search history.

(56) References Cited

U.S. PATENT DOCUMENTS

2011/0273882 A1* 11/2011 Pickard .............. F21K 9/00
362/237
2013/0094218 A1* 4/2013 Wang ................ F21V 5/04
362/311.02
(Continued)

FOREIGN PATENT DOCUMENTS

KR 10-2012-0011185 A 2/2012
KR 10-2014-0097724 A 8/2014
(Continued)

*Primary Examiner* — Alexander K Garlen
*Assistant Examiner* — Eric T Eide
(74) *Attorney, Agent, or Firm* — Don D. Cha; HDC IP Law, LLP

(57) ABSTRACT

A light diffusion lens improved in hot spot phenomenon and darkness phenomenon is disclosed, the light diffusion lens diffusing a light generated from an LED, including:
a semi-spherical body formed with a glass material or a plastic material;
an upper surface forming an upper outer shape of body;
a lower surface forming a lower outer shape of body;
an oval-shaped incident port formed at a center of lower surface to accommodate the LED; and
an incident surface convexly formed from the incident port to an upper surface side.

7 Claims, 10 Drawing Sheets

(51) Int. Cl.
　　　*G02B 19/00*　　　(2006.01)
　　　*G02B 1/04*　　　(2006.01)
　　　*F21W 131/40*　　　(2006.01)
　　　*F21Y 115/10*　　　(2016.01)
(52) U.S. Cl.
　　　CPC ..... *G02B 19/0014* (2013.01); *G02B 19/0061* (2013.01); *F21W 2131/40* (2013.01); *F21Y 2115/10* (2016.08)

(56) References Cited

U.S. PATENT DOCUMENTS

| | | | | |
|---|---|---|---|---|
| 2014/0003059 | A1* | 1/2014 | Wang | F21V 13/04 |
| | | | | 362/308 |
| 2015/0029727 | A1* | 1/2015 | Ikeda | F21V 5/00 |
| | | | | 362/311.01 |
| 2015/0117016 | A1* | 4/2015 | Kim | F21K 9/64 |
| | | | | 362/293 |

FOREIGN PATENT DOCUMENTS

| | | |
|---|---|---|
| KR | 10-2015-0116607 A | 10/2015 |
| KR | 10-1690740 B1 | 12/2016 |
| WO | 2013-094599 A1 | 6/2013 |

\* cited by examiner

LIGHT DIFFUSION LENS

TECHNICAL FIELD

The present disclosure relates to a light diffusion lens configured to diffuse a light generated from an LED, and particularly, to a light diffusion lens improved in hot spot phenomenon and a darkness phenomenon.

BACKGROUND ART

Recently, instances are increased where an LED (Light-Emitting Diode) is used as a light source across the entire industrial field including the lighting devices, and as a result, researches are also briskly waged in every industrial field in order to efficiently and effectively use the LED.

A light generated from an LED has a characteristic where a light distribution is concentrated on a central area over a surrounding, and therefore, the light is not evenly distributed to the surrounding area, and a front surface area of LED becomes disadvantageously brighter and the light is gradually darkened as distanced from the front area of LED.

In order to solve the abovementioned disadvantages, demands on technologies to evenly diffuse a light generated from an LED are on the increase.

Meantime, although it is necessary to diffuse a light emitted from an LED evenly and symmetrically, it is also necessary to diffuse the light only to a particular direction more profusely depending on arrangement of LED. For example, when a horizontally gapped arrangement of LED is denser than a vertically gapped arrangement of LED, an entire even distribution of light can be obtained when the light is more diffused to a vertical direction while the light is less diffused to a horizontal direction.

Therefore, demands on technologies to evenly and asymmetrically diffuse a light emitted from an LED are on the increase.

FIG. 1 is a perspective view illustrating a light diffusion lens according to prior art.

Referring to the conventional light diffusion lens (50) may include a semi-spherical body, an equiaxed upper surface (54), a plane surfaced lower surface (56) and an equiaxed lateral surface (58) perpendicular to the lower surface (56).

The lower surface (56) may be disposed at a center with an incident port (not shown) accommodated by an LED (not shown). Furthermore, an incident surface (60) may be formed that is convexly recessed from the incident port to a direction of the upper surface (54). Each of the upper surface (54) and the incident surface (60) may have a predetermined curvature.

FIG. 2 is a schematic view illustrating a light diffusion operation of a light diffusion lens according to the prior art as shown in FIG. 1.

FIG. 2 is a schematic view illustrating a light refraction state inside a light diffusion lens according to the prior art.

Referring to FIG. 2, a light emitted from an LED may be introduced into the body (52) through the incident surface (60), and emitted to outside through the upper surface (54).

The body (52) may be formed with a glass or a plastic material. Thus, the body (52) may be higher in density than the air and also higher in refractive index.

The light emitted from the LED may be introduced into the body (52) through the incident surface (60), and initially refracted, emitted from the body (52) through the upper surface (54) and refracted second time.

The light emitted from the LED may be emitted through a path more bent to a surrounding direction than an original path due to density difference between the air and the body (52). That is, the light emitted from the LED is diffused to a surrounding area.

The light reflected again from the lower surface (56) after being bent from the upper surface (54) to the lower surface (56) in FIG. 2 is caused by an inner reflection. It can be ascertained from FIG. 2 that the light distribution state by a single light diffusion lens shows that there is a bright area in the center.

According to FIG. 2, a BLU (Back Light Unit), wherein a light distribution made by each light diffusion lens is respectively arranged in series, is alternated with a dark area and a bright area, and as a result, it can be ascertained therefrom that the quality of BLU set is deteriorated.

FIG. 3 is a schematic view illustrating a light distribution state obtained by a light diffusion lens of FIG. 1 according to the prior art.

Referring to FIG. 3, it can be ascertained that the light distribution forms a rotating symmetrical shape, which is due to the fact that the light diffusion lens (50) illustrated in FIG. 1 has a rotating symmetrical light distribution characteristic.

Referring to FIG. 3 again, it can be noted from FIG. 3 that there are areas darker than surrounding areas, and there are areas brighter than surrounding areas. A particularly bright area in the center among the bright areas is called a hot spot, and a dark area around the hot spot is called a dark portion (darkness).

The brightness contrast between the hot spot and the dark portion is so great as to be a cause of hindering an even light distribution. Thus, demands are required to maximally mitigate the hot spot and the dark portion generated from a light diffusion lens.

The hot spot and the dark portion are known to be generated from limit of diffusion and total reflection within a light diffusion lens, that is, a light on a central area among lights emitted from an LED not being fully diffused to a surrounding area.

FIG. 4 is a schematic view illustrating a strength distribution of light diffused by a light diffusion lens of FIG. 1.

The vertical axis in FIG. 4 shows a distance from an optical axis (unit: mm) and a horizontal axis shows an optical strength (unit: Lux).

Referring to FIG. 4, it can be noted from FIG. 4 that an area where an optical strength reaches a peak at a central area becomes a hot spot and an area where the optical strength is greatly decreased becomes a dark portion. Furthermore, it can be also ascertained from FIG. 4 that an optical strength distribution is abruptly uneven between the hot spot and the dark portion while the optical strength distribution is relatively smooth and evenly distributed between the dark portion and an edge.

FIG. 5 is a schematic view illustrating a light diffusion device where several light diffusion lenses of FIG. 1 are arranged to a crosswise direction.

The light diffusion device (70) illustrated in FIG. 5 needs adjustment of light distribution of each light diffusion lens because a plurality of light diffusion lenses is adjacently disposed.

DISCLOSURE

Technical Problem

The present disclosure has been made to solve the foregoing disadvantages/problems of the prior art and therefore an object of certain embodiments of the present invention is to provide a light diffusion lens having an asymmetrical light distribution.

The technical challenge to be achieved by the present invention is not limited to the aforementioned technical challenge, and those skilled in the art would clearly understand other un-mentioned technical challenges from the following recitation.

Technical Solution

In one general aspect of the present disclosure, there is provided a light diffusion lens diffusing a light generated from an LED, comprising:
a semi-spherical body formed with a glass material or a plastic material;
an upper surface forming an upper outer shape of body;
a lower surface forming a lower outer shape of body;
an oval-shaped incident port formed at a center of lower surface to accommodate the LED; and
an incident surface convexly formed from the incident port to an upper surface side, wherein
the incident surface has an apex disposed on an optical axis of LED, and a vertical cross-section of the incident surface is extended from the apex to the incident port to have a sag profile expressed by the following conditional expression:

$$z_1 = \frac{(c_{s1} r_{s1}^2)}{\left(1 + \sqrt{1-(1+k)\, c_{s1}^2 r_{s1}^2}\right)}$$

where,
z1 is a sag profile of incident surface,
k is a conic constant,
Cs1 is curvature expressed by 1/rs1, where,
rs1 is a radius of curvature, and the incident surface includes a plurality of inflection points where the curvature Cs1 is changed.

Preferably, but not necessarily, the plurality of inflection points may be formed within a scope of 20° about an optical axis of LED.

Preferably, but not necessarily, the conic constant k of incident surface sag profile z1 may satisfy a condition of k=−1.

Preferably, but not necessarily, the curvature Cs1 may be increased from an apex of incident surface to an incident port side.

Preferably, but not necessarily, wherein a difference of vertex heights of each sag profile may be maximally less than 5 mm, when the number of inflection points is n, and there are sequentially formed along an incident port direction from an apex of incident surface with the inflection point as a border, a 1st incident surface having a sag profile in response to a first curvature, a nth incident surface having a sag profile in response to a nth curvature, and a n+1th incident surface having a sag profile in response to a n+1 curvature.

Preferably, but not necessarily, the incident surface may be anisotropic where an incident surface sag profile to a minor axis direction of light diffusion lens is mutually different from an incident surface sag profile to a major axis direction of light diffusion lens, wherein, a ratio between Ca and Cc is more than 1.2 when a curvature of incident surface sag profile to a major axis direction of light diffusion lens is Ca, and a curvature of incident surface sag profile to a minor axis direction of light diffusion lens is Cc.

Preferably, but not necessarily, the upper surface may have an apex disposed on an optical axis of LED, and a vertical cross-section of the upper surface may be extended from the apex to an edge of lower surface and has a sag profile expressed by the following conditional expression:

$$z_2 = \frac{(c_{s2} r_{s2}^2)}{\left(1 + \sqrt{1-(1+k)\, c_{s2}^2 r_{s2}^2}\right)}$$

where,
z2 is a sag profile of upper surface,
K is a conic constant,
Cs2 is a curvature of 1/rs2,
rs2 is a radius of curvature.

Preferably, but not necessarily, the conic constant k of upper surface sag profile z2 may satisfy a condition of k<−1.

Preferably, but not necessarily, the upper surface may be anisotropic where an upper surface sag profile to a minor axis direction of light diffusion lens is mutually different from an upper surface sag profile to a major axis direction of light diffusion lens, wherein, a ratio between Cb and Cd is more than 1.2 when a curvature of upper surface sag profile to a major axis direction of light diffusion lens is Cb, and a curvature of upper surface sag profile to a minor axis direction of light diffusion lens is Cd.

Preferably, but not necessarily, if Ca>Cc, Cb<Cd, and if Ca<Cc, Cb>Cd, where,
Ca: curvature of incident surface sag profile to a major axis direction of light diffusion lens;
Cb: curvature of upper surface sag profile to a major axis direction of light diffusion lens;
Cc: curvature of incident surface sag profile to a minor axis direction of light diffusion lens; and
Cd: curvature of upper surface sag profile to a minor axis direction of light diffusion lens.

Preferably, but not necessarily, minor axis/major axis direction of light diffusion lens and minor axis/major axis direction of incident port may be mutually different by 90°.

Preferably, but not necessarily, the light diffusion lens may satisfy the following conditional expression:

$$1.9 \geq \frac{\theta 4}{\theta 3} > \frac{\theta 8}{\theta 7} > \frac{\theta 2}{\theta 1} > \frac{\theta 6}{\theta 5} \geq 1$$

where,
θ1: incident angle of light incident on an incident surface from major axis direction of light diffusion lens;
θ2: refractive angle of light refracted from an incident surface from major axis direction of light diffusion lens;
θ3: incident angle of light incident on an upper surface from major axis direction of light diffusion lens;
θ4: refractive angle of light refracted from an upper surface from major axis direction of light diffusion lens;
θ5: incident angle of light incident on incident surface from minor axis direction of light diffusion lens;
θ6: refractive angle of light refracted from incident surface from minor axis direction of light diffusion lens;
θ7: incident angle of light incident on upper surface from minor axis direction of light diffusion lens; and
θ8: refractive angle of light refracted from upper surface from minor axis direction of light diffusion lens.

Preferably, but not necessarily, wherein, the light diffusion lens may further comprise: a lateral surface connecting an edge of upper surface and an edge of lower surface, wherein the lateral surface includes first and third lateral surfaces each having a first height, and second and fourth lateral surfaces each having a second height lower than the first height, when a shortest distance between any one point of an edge of upper surface to a distance to an edge of lower surface is a height of lateral surface.

Advantageous Effects

The light diffusion lens according to exemplary embodiments of the present disclosure has an advantageous effect in that a light emitted from an LED can be evenly and asymmetrically diffused.

BEST MODE FOR INVENTION

Figure 6:
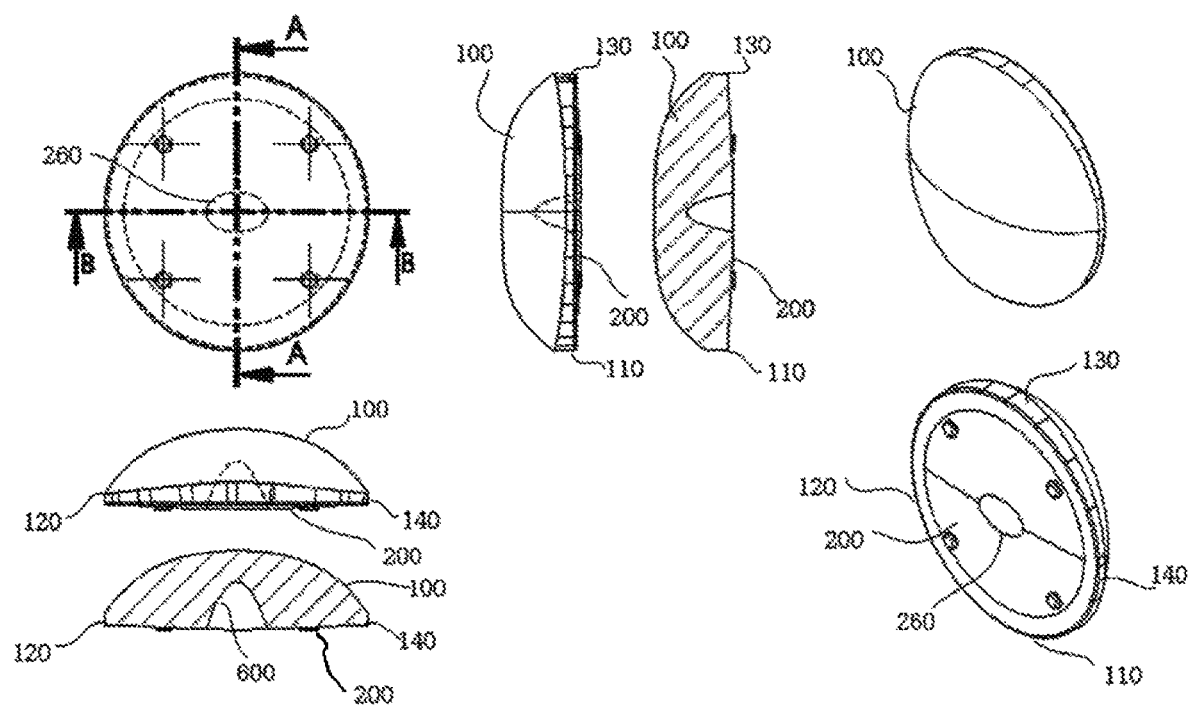
FIG. 6 is a schematic view illustrating a configuration of light diffusion lens according to the present invention.

FIG. 6 is a schematic view illustrating a configuration of light diffusion lens according to the present invention.

Referring to FIG. 6, the light diffusion lens (10) according to the present invention may include an upper surface (100) having a semi-spherical body to form an upper external shape of body, a lower surface (200) forming a lower external shape of body, and plane surface-shaped lateral surfaces (110, 120, 130,140) perpendicular to the lower surface (200).

The upper surface (100) may be a curved surface gradually increasing in curvature to an edge from an uppermost center portion and may take a convex shape. The lower surface (200) may be a curved surface having a curvature smaller than that of a center portion of upper surface (100).

The lateral surfaces (110, 120, 130, 140) may connect an edge of upper surface (100) and an edge of lower surface (200). A shortest distance from any one point of edge at the upper surface (100) to an edge of lower surface (200) may be a height of the lateral surfaces (110, 120, 130, 140). The height of lateral surfaces (110, 120, 130, 140) may be a second height or a first height. For ease of explanation, the first height is assumed to be greater in value than the second height. The lateral surfaces (110, 120, 130, 140) may include a first lateral surface (110) and a third lateral surface (130) having a first height, and second lateral surface (120) and a fourth lateral surface (140) having s second height.

A center of the lower surface (200) may be disposed with an incident port (260) accommodated by an LED (300). Furthermore, a convexly recessed incident surface (600) may be disposed from the incident port (260) toward an upper surface (100) direction. The incident port (260) may be disposed with an elliptical shape formed at the lower surface (200) with a major axis and a minor axis. The major axis may be disposed on an imaginary solid line connecting the second lateral surface (120) and the fourth lateral surface (140). The minor axis may be disposed on an imaginary solid line connecting the first lateral surface (110) and the third lateral surface (130). For ease of explanation hereinafter, a major axis direction may be a direction connecting the second lateral surface (120) and the fourth lateral surface (140), and a minor axis direction may be a direction connecting the first lateral surface (110) and the third lateral surface (130).

MODE FOR INVENTION

Advantages and characteristics of the present embodiment and methods for addressing the same will be clearly understood from the following embodiments taken in conjunction with the annexed drawings. However, the present disclosure is not limited to the embodiments and may be realized in various other forms. The embodiments are only provided to more completely illustrate the present disclosure and to render a person having ordinary skill in the art to fully understand the scope of the present disclosure. The scope of the present disclosure is defined only by the claims. The same reference numbers will be used throughout the specification to refer to the same or like parts.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 6 is a schematic view illustrating a configuration of light diffusion lens according to the present invention.

Referring to FIG. 6, the light diffusion lens (10) according to the present invention may include an upper surface (100) having a semi-spherical body to form an upper external shape of body, a lower surface (200) forming a lower external shape of body, and plane surface-shaped lateral surfaces (110, 120, 130,140) perpendicular to the lower surface (200).

The upper surface (100) may be a curved surface gradually increasing in curvature to an edge from an uppermost center portion and may take a convex shape. The lower surface (200) may be a curved surface having a curvature smaller than that of a center portion of upper surface (100).

The lateral surfaces (110, 120, 130, 140) may connect an edge of upper surface (100) and an edge of lower surface (200). A shortest distance from any one point of edge at the upper surface (100) to an edge of lower surface (200) may be a height of the lateral surfaces (110, 120, 130, 140). The height of lateral surfaces (110, 120, 130, 140) may be a second height or a first height. For ease of explanation, the first height is assumed to be greater in value than the second height. The lateral surfaces (110, 120, 130, 140) may include a first lateral surface (110) and a third lateral surface (130) having a first height, and second lateral surface (120) and a fourth lateral surface (140) having s second height.

A center of the lower surface (200) may be disposed with an incident port (260) accommodated by an LED (300). Furthermore, a convexly recessed incident surface (600) may be disposed from the incident port (260) toward an upper surface (100) direction. The incident port (260) may be disposed with an elliptical shape formed at the lower surface (200) with a major axis and a minor axis. The major axis may be disposed on an imaginary solid line connecting the second lateral surface (120) and the fourth lateral surface (140). The minor axis may be disposed on an imaginary solid line connecting the first lateral surface (110) and the third lateral surface (130). For ease of explanation hereinafter, a major axis direction may be a direction connecting the second lateral surface (120) and the fourth lateral surface (140), and a minor axis direction may be a direction connecting the first lateral surface (110) and the third lateral surface (130).

Figure 7:
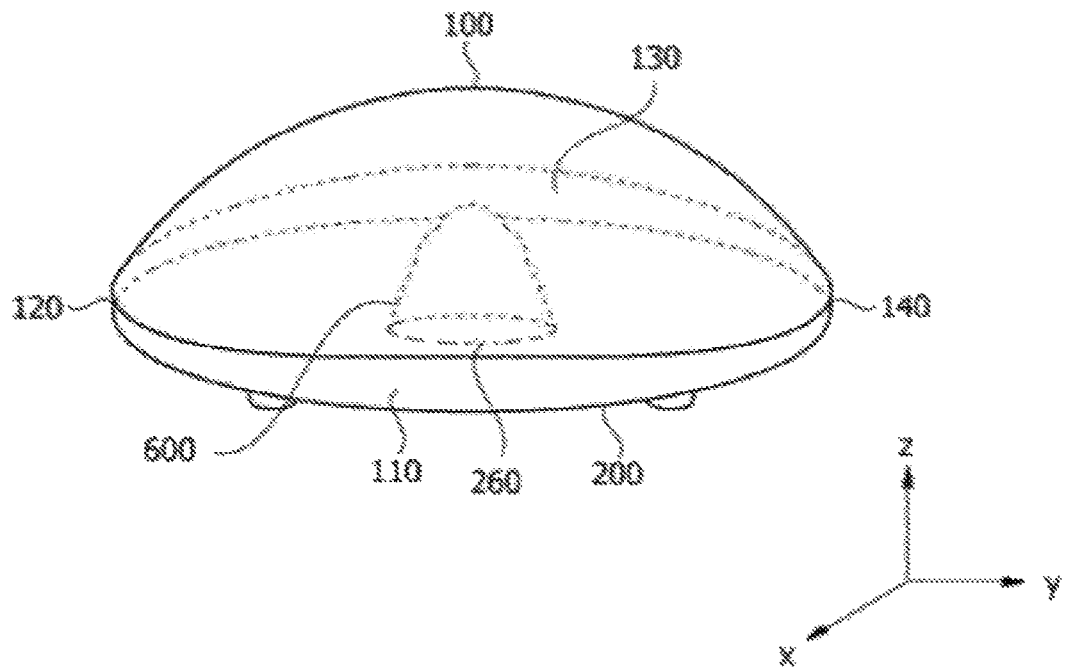
FIG. 7 is a schematic three-dimensional view illustrating configuration of light diffusion lens taken from B-B direction (minor axis direction of light diffusion lens, y direction) of FIG. 6.
Figure 8:
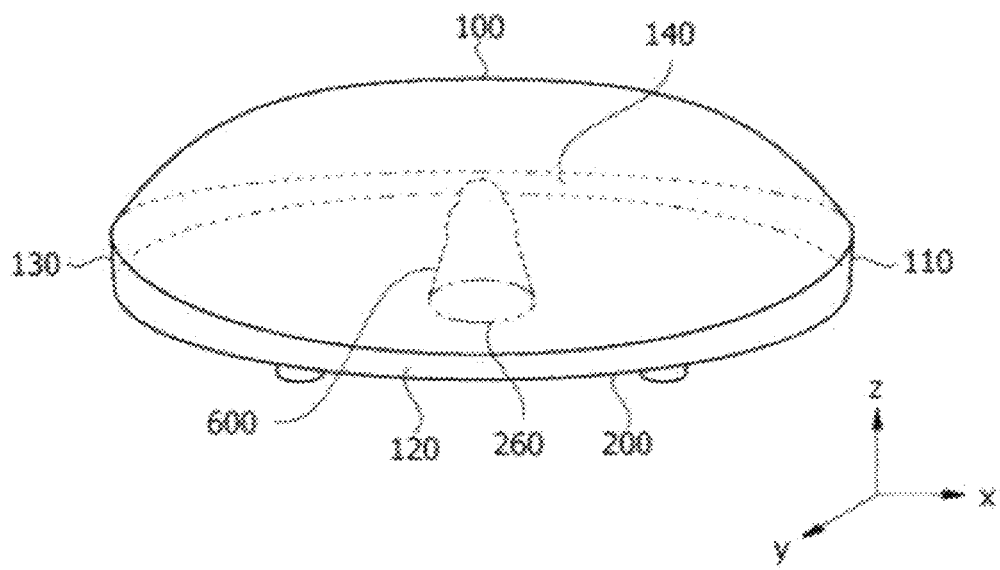
FIG. 8 is a schematic three-dimensional view illustrating configuration of light diffusion lens taken from A-A direction (major axis direction of light diffusion lens, x direction) of FIG. 6.

FIG. 7 is a schematic three-dimensional view illustrating configuration of light diffusion lens taken from B-B direction (minor axis direction of light diffusion lens, y direction) of FIG. 6, and FIG. 8 is a schematic three-dimensional view illustrating configuration of light diffusion lens taken from A-A direction (major axis direction of light diffusion lens, x direction) of FIG. 6.

Referring to FIGS. 7 and 8, the incident surface (600) may be formed by being inwardly recessed from the incident port (260) into the light diffusion lens (10). The incident surface (600) may take a semi-spherical shape.

According to an exemplary embodiment of present invention, a central point of incident port (260) and a central point of lower surface (200) may be matched and the incident port may be formed at a central portion of surface of a lower block surface (220).

When the central point of incident port (260) and the central point of lower surface (200) are matched, the central point of incident port (260), the central point of incident surface (600) may be matched to a center of light diffusion lens (10). The LED (300) may be so disposed as to pass at its optical axis an apex of incident surface (600) from the center of incident port (260).

According to an exemplary embodiment of present invention, the reason of a curvature of minor axis direction on the incident surface (600) being asymmetrical with a curvature of major axis direction is to allow a light emitted from the LED (300) to be asymmetrically introduced about the incident surface (600) when the light emitted from the LED (300) is refracted from the incident surface (600).

A sag profile z1 of incident surface (600) may be expressed by the following conditional expression (1).

$$z_1 = \frac{(c_{s1} r_{s1}^2)}{\left(1 + \sqrt{(1-(1+k)c_{s1}^2 r_{s1}^2)}\right)} \quad \text{Conditional Expression (1)}$$

where,
z1 is a sag profile of incident surface (600),
k is a conic constant,
Cs1 is curvature expressed by 1/rs1, and
rs1 is a radius of curvature.

The shape of sag profile according to the conic constant k value may be given as per the following Table.

| Conic Constant | Surface Type |
| --- | --- |
| K = 0 | spherical |
| K = −1 | Paraboloid |
| k < −1 | hyperboloid |
| −1 < k < 0 | ellipsoid |
| k > 0 | Oblat ellipsoid |

In the light diffusion lens (10) according to the present invention, the incident surface (600) may be "k=−1" and may be preferably a paraboloid.

In the light diffusion lens (10) according to the present invention, the sag profile of incident surface (600) may not be consistent from an apex of incident surface (600) along a direction to the incident port (260).

That is, the incident surface (600) may be isotropic or anisotropic. FIGS. 7 and 8 illustrate an example where the incident surface (600) is anisotropic. Here, the incident surface (600) may be anisotropic where a sag profile of incident surface (600) of minor axis direction of the light diffusion lens (10) is mutually different from a sag profile of incident surface (600) of major axis direction of light diffusion lens (10), and it is preferable that a ratio between Ca and Cc is more than 1.2 when a curvature of sag profile of incident surface to a major axis direction of light diffusion lens (10) is Ca, and a curvature of sag profile of incident surface to minor axis direction of light diffusion lens (10) is Cc.

Meanwhile, the incident surface (600) may be formed with a plurality of auxiliary incident surfaces (610, 620, 630) each having a mutually different sag profile. Here, the mutually different sag profiles may be expressed by the conditional expression (1) and each of the mutually different sag profiles may have a mutually different curvature.

Figure 1:
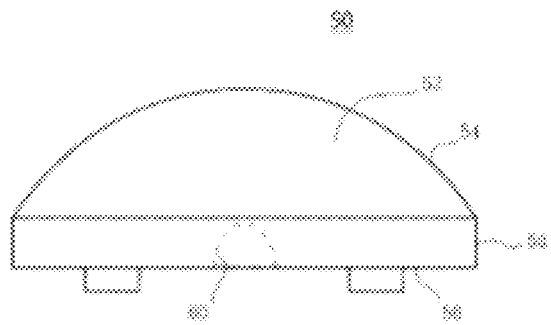
FIG. 1 is a perspective view illustrating a light diffusion lens according to prior art.
Figure 2:
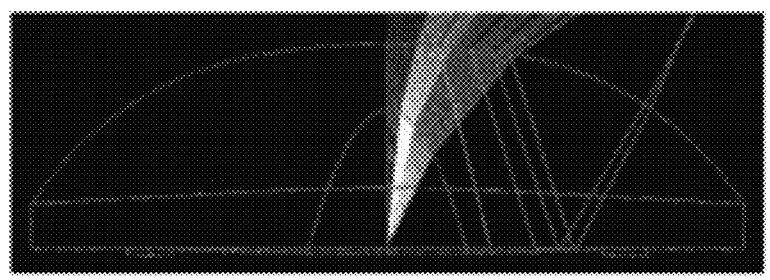
FIG. 2 is a schematic view illustrating a light refraction state inside a light diffusion lens according to the prior art.
Figure 3:
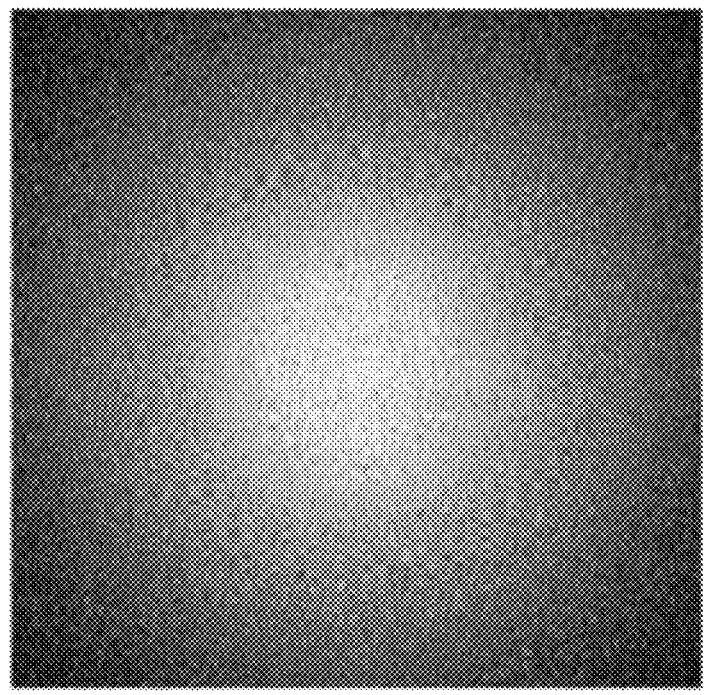
FIG. 3 is a schematic view illustrating a light distribution state obtained by a light diffusion lens of FIG. 1 according to the prior art.
Figure 4:
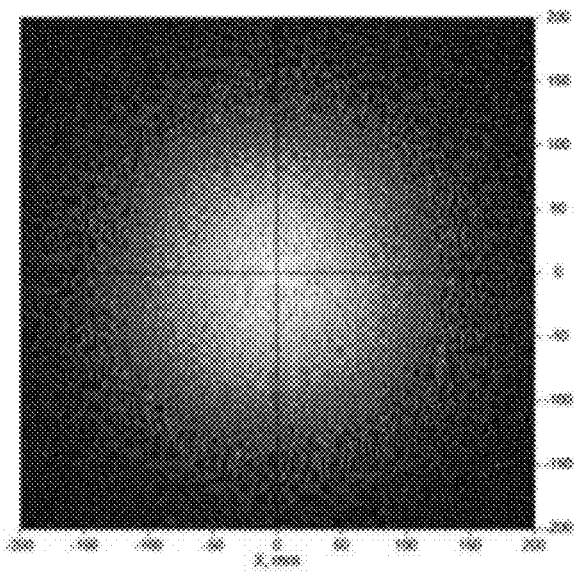
FIG. 4 is a schematic view illustrating a strength distribution of light diffused by a light diffusion lens of FIG. 1.
Figure 5:
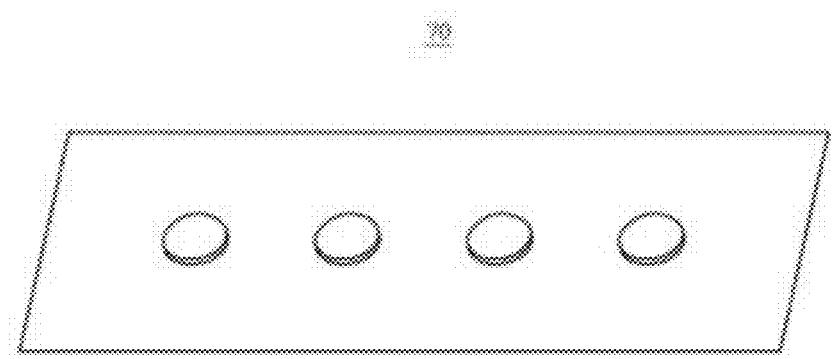
FIG. 5 is a schematic view illustrating a light diffusion device where several light diffusion lenses of FIG. 1 are arranged to a crosswise direction.

Referring to FIG. 4, it can be noticed that a spot corresponds to an area higher in light strength than a surrounding area, and a dark portion corresponds to an area lower in light strength than a surrounding area.

Hence, it can be also noted that, in order to improve the spot and the dark portion, necessity is required to disperse the light to a surrounding area for an area where the light strength is higher than the surrounding area, and to disperse the light to an area where the dark portion is generated for an area where the light strength is lower than the surrounding area.

In the present invention, a plurality of inflection points may be made to be formed on an incident surface in order to disperse the light strength.

Referring to FIG. 4 again, it can be noted that the inflection points are preferably disposed in a plural number about an area where the spots and dark portions are generated. In consideration of distribution characteristics of light generated from the LED, influences of hot spot and dark portion generated within 20° about an optical axis are the greatest. Thus, it is also preferable that the inflection point be arranged within a scope of 20° about an optical axis. However, the generated position of hot spot and dark portion may be different depending on type of diffusion lens and usage, and as a result, the position of inflection point may be differed. However, the present invention is not limited thereto.

Referring to FIGS. 7 and 8, a curvature from a center of upper surface (100) to an edge of upper surface (100) may gradually increase. The changes in the curvature may not be constant depending on direction from a center of upper surface (100) to an edge.

The changes in curvature from the center of upper surface (100) to a direction of first lateral surface (110) and the third lateral surface (130) may be constant, and changes in curvature to a direction of second lateral surface (120) and the fourth lateral surface (140) may be also same. However, changes in curvature to a direction of first lateral surface (110) and the third lateral surface (130) may be different from changes in curvature to a direction of second lateral surface (120) and the fourth lateral surface (140). As a result, a cross-section to a vertical direction passing a center of upper surface (100) of light diffusion lens (10) may be horizontally symmetrical but may not be rotationally symmetrical.

For example, the increase in curvature from a center of upper surface (100) to an edge toward an x axis direction may be greater than the increase in curvature from a center of upper surface (100) to an edge toward a y axis direction. That is, the upper surface (100) may be isotropic or anisotropic. FIGS. 7 and 8 illustrate an example where the upper surface (100) is anisotropic.

According to the exemplary embodiment of present invention, the reason of the curvature to an x-axis direction and the curvature to a y-axis direction on the upper surface (100) being anisotropic is to allow a light emitted from the LED (300) to be emitted anisotropically based on a center of upper surface (100) when the light emitted from the LED (300) is refracted from the upper surface (100) and outputted to an outside.

The sag profile z2 of upper surface (100) may be expressed by the following conditional expression (2).

$$z_2 = \frac{(c_{s2} r_{s2}^2)}{\left(1 + \sqrt{1 - (1+k)c_{s2}^2 r_{s2}^2}\right)} \quad \text{The Conditional Expression (2)}$$

where,
z2 is a sag profile of upper surface,
K is a conic constant,
Cs2 is a curvature of 1/rs2,
rs2 is a radius of curvature.

In the light diffusion lens (10) according to the present invention, the incident surface (600) may be "k<−1" and may be preferably a hyperboloid (see Table 1).

In the light diffusion lens (10) according to the present invention, the upper surface (100) is anisotropic because the sag profile z2s of incident surface (600) to a minor axis direction of light diffusion lens (10) is mutually different from the sag profile x21 of incident surface (600) to a major axis direction of light diffusion lens (10), and it is preferable that a ratio between Cb and Cd is more than 1.2 when a curvature of sag profile of incident surface to a major axis direction of light diffusion lens (10) is Cb, and a curvature of sag profile of incident surface to minor axis direction of light diffusion lens (10) is Cd.

Furthermore, it is preferable that minor axis/major axis direction of light diffusion lens (10) and minor axis/major axis direction of incident port (600) be mutually different by 90°.

Figure 9:
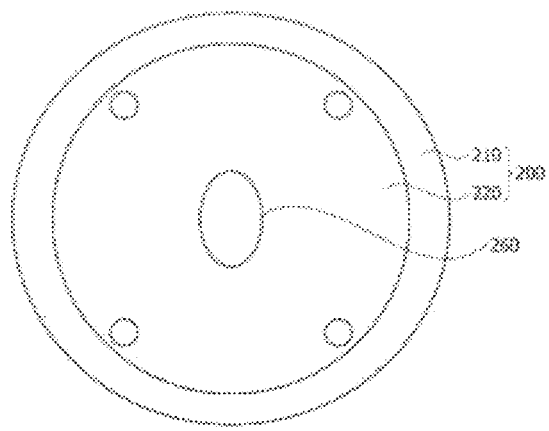
FIG. 9 is a bottom view illustrating a bottom shape of light diffusion lens according to the present invention.

FIG. 9 is a bottom view illustrating a bottom shape of light diffusion lens according to the present invention.

The lower surface (200) may be a curved surface having a curvature smaller than a curvature of center portion of upper surface (100).

Referring to FIG. 9, the lower surface (200) according to an exemplary embodiment of present invention may be round or elliptic in cross-section, and may take a downwardly convex shape. The lower surface (200) may include a downwardly convex surface (220) that is downwardly convexed relative to a plane surface (210). A predetermined length of the lower surface (200) may be formed with the plane surface (210) from an edge to a central direction, and may be formed with the downwardly convexed surface (220) from a point where the plane surface (210) ends to the center. That is, although the lower surface (200) has a zero (0) curvature from an edge to a center direction for a predetermined length, the lower surface (200) may take a shape where the curvature increases from the predetermined length to the center but decreases again.

According to an exemplary embodiment of present invention, a downwardly-emitted light among the lights emitted from the LED (300) can be more totally reflected to an upper surface direction over a case where the lower convexed surface (220) is not formed and formed with a flat surface, because the lower surface (200) is formed with the lower convexed surface (220).

The lights emitted from the LED (300) may be refracted by being incident into the light diffusion lens (10) through the incident surface (600), and may be refracted once more within the light diffusion lens (10) to the upper surface (100) or to the lateral surfaces (110, 120, 130, 140) and then emitted to an outside.

Figure 10:
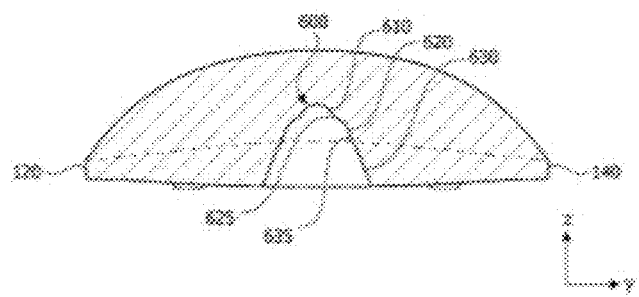
FIG. 10 is a cross-sectional view of light diffusion lens cut out along a B-B direction of FIG. 6.
Figure 11:
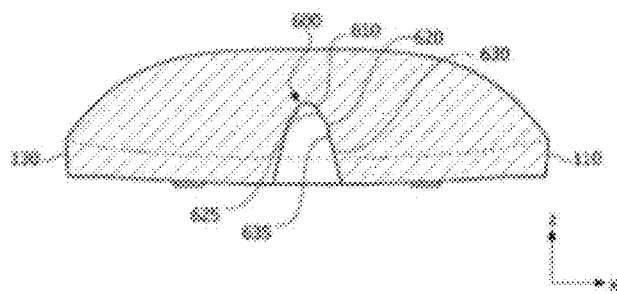
FIG. 11 is a cross-sectional view of light diffusion lens cut out along an A-A direction of FIG. 6.

FIG. 10 is a cross-sectional view of light diffusion lens cut out along a B-B direction of FIG. 6, and FIG. 11 is a cross-sectional view of light diffusion lens cut out along an A-A direction of FIG. 6.

Referring to FIGS. 10 and 11, an incident surface (600) may take a convexly recessed shape from an incident port (260) toward an upper surface (100) side. The incident surface (600) may have a predetermined curvature, and a radius of curvature may be increased from an apex of incident surface (600) toward the incident port (260).

Here, the incident surface (600) may have an apex disposed on an optical axis of LED (300), and a cross-section of incident surface (600) may have a paraboloid shape extended from the apex to the incident port (260), and may have a plurality of inflection points existent within 20° about the optical axis.

When the number of inflection points is n, and the inflection point may be sequentially formed, from an apex of incident surface to an incident port direction with the inflection point as a border, with first auxiliary incident surface having a first curvature, a nth auxiliary incident surface having an nth curvature, and an n+1th auxiliary incident surface having an n+1th curvature.

FIGS. 10 and 11 illustrate an example where three (3) auxiliary incident surfaces (610, 620, 630) are formed by horizontally dividing a lower surface of incident surface (600) from the apex of incident surface (600).

The first to third auxiliary incident surfaces (610, 620, 630) may be divided by the inflection points (625, 635) as a border, and may be expressed by an incident surface profile z1 expressed by the first conditional expression (1), and may have mutually different curvatures.

Here, the inflection points (625, 635) may be present within a scope of 20° about a center of optical axis of LED (300).

Figure 12:
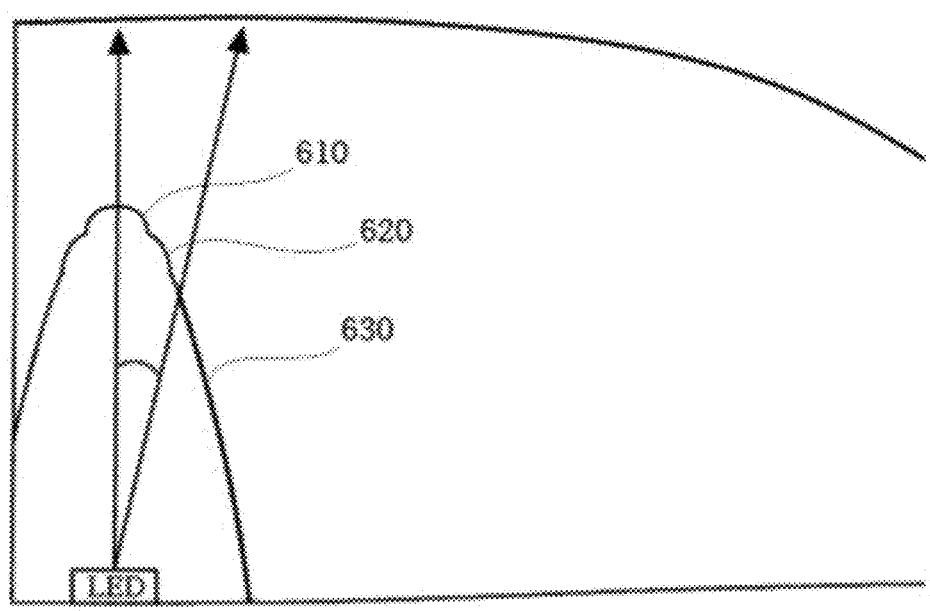
FIG. 12 is a schematic view illustrating an alignment relationship between an optical axis of LED and an incident surface.

FIG. 12 is a schematic view illustrating an alignment relationship between an optical axis of LED and an incident surface.

Referring to FIG. 12, a center of upper surface on the LED (300) disposed on the lower surface (200) may be an origin and inflection points (625, 635) may be disposed within a scope of 20° based on the optical axis. The two said inflection points may be respectively disposed at a position where the first auxiliary incident surface (610) and the second auxiliary incident surface (620) are extended, and at a position where the second auxiliary incident surface (620) and the third incident surface (630) are extended.

Figure 13:
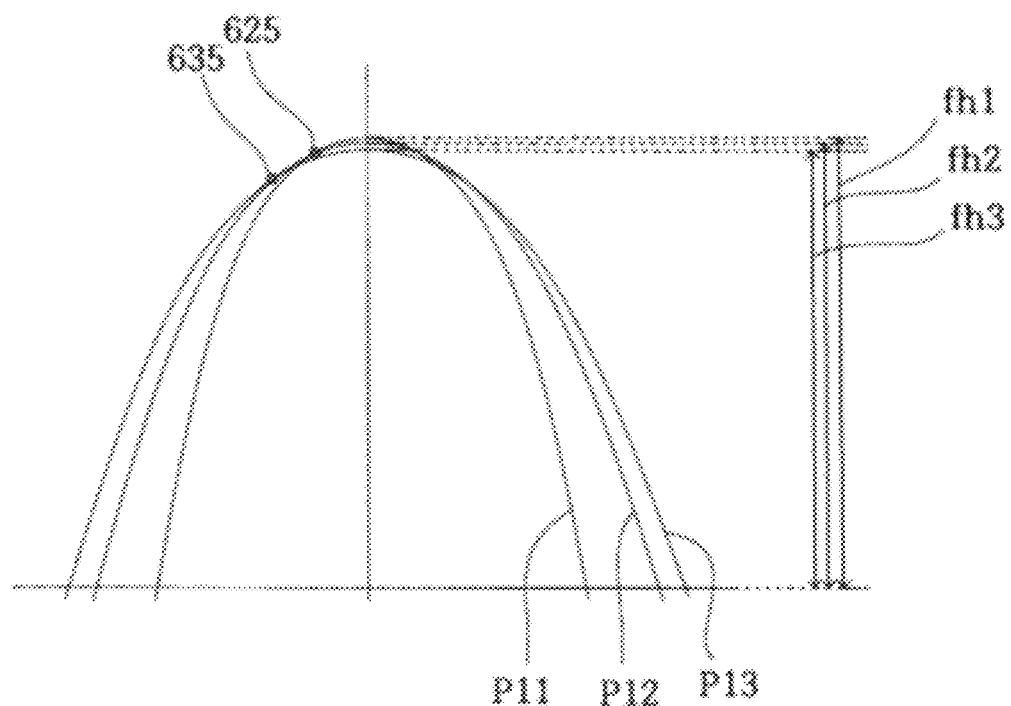
FIG. 13 is a schematic view illustrating a comparison of parabolas tangent to a plurality of auxiliary incident surfaces according to the present invention.

FIG. 13 is a schematic view illustrating a comparison of paraboloids tangent to a plurality of auxiliary incident surfaces according to the present invention.

FIG. 13 illustrates three (3) paraboloids. What is illustrated as a line with a smallest radius of curvature is a paraboloid tangent to the first auxiliary incident surface (610) at an upper end, and what is illustrated as a line with a larger radius of curvature is a paraboloid tangent to the second auxiliary incident surface (620) at an intermediate end, and what is illustrated as a line with a largest radius of curvature is a paraboloid tangent to the third auxiliary incident surface (630) at the lower end. These paraboloids may be expressed in a sag profile of conditional expression (2), and may have mutually different radius of curvature.

Each paraboloid (p11, p12, p13) may contact the relevant auxiliary incident surfaces (610, 620, 630).

As noted from the foregoing, the radius of curvature of first auxiliary incident surface (610) is the smallest, and the radius of curvature of the third auxiliary incident surface (630) is the largest. The radius of curvature of second auxiliary incident surface (620) may be greater than the radius of curvature of first auxiliary incident surface (610) but smaller than the radius of curvature of third auxiliary incident surface (630).

Meantime, the curvature grows greater when descending from the apex toward an incident port (260) side, and a height difference of apex must be generated in order to make an effect. If paraboloids each having a different curvature have an apex at the same height, paraboloids having relatively larger curvatures may enter into paraboloids having smaller curvatures to thereby remove the multistage effect.

When a height of apex for the paraboloid (p11) tangent to the first auxiliary incident surface (610), a height of apex for the paraboloid (p12) tangent to the second auxiliary incident surface (620) and a height of apex for the paraboloid (p13) tangent to the third auxiliary incident surface (630), that is, each height from the lower surface (200) of light diffusion lens (10) to each apex of each paraboloid (p11, p12, p13) is given respectively as fh1, fh2, fh3, it is preferable that a deviation there among be maximally less than 5 mm.

Meantime, it can be noted from FIG. 13 that there exist two inflection points (625, 635). It is also noted that a small circle was used instead of dot in FIG. 11 in order to easily indicate the existence of inflection points (625, 635).

The inflection points (625, 635) in the light diffusion lens (10) according to the present invention may be horizontally present within a scope of 20° based on the center of an optical axis. This is to consider the strength distribution of light emitted from the LED (300). As is known in the art, the strength of light emitted from the LED (300) has a Gaussian distribution, and has a characteristic in which most of lights are concentrated within a scope of 20° based on a center of optical axis.

Figure 14:
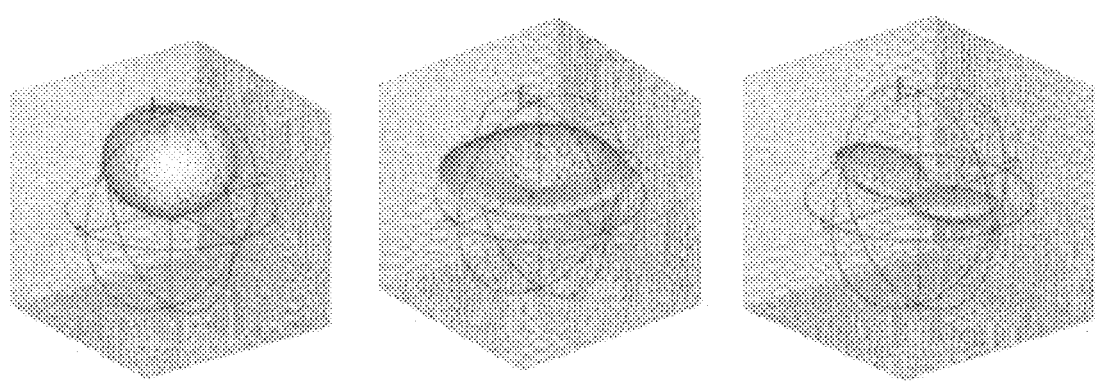
FIG. 14 is a schematic view illustrating a light distribution state of LED and a light distribution state applied with a lens.

FIG. 14 is a schematic view illustrating a light distribution state of LED and a light distribution state applied with a lens.

FIG. 14 is illustrated to show an asymmetrical light distribution shape when the LED passes through a light diffusion lens, albeit having a rotational symmetrical light distribution. A left figure of FIG. 14 illustrates a light distribution of LED, a middle figure and a right figure respectively show a light distribution when an LED is applied with a rotational symmetrical lens and an asymmetrical lens.

Moreover, FIG. 14 shows a light intensity based on angles when a lighting system having an LED and a light diffusion lens is viewed from a far distance to be regarded as a point light source. Here, Candela is a luminous intensity and unit uses cd.

It can be noted from FIG. 14 that a light emitted from an LED is rotationally symmetrical. A light emitting surface having a same brightness at all directions regardless of directions facing a diffuse (diffusing) surface is called a perfectly diffused surface, and a white paper or a full moon may be near to the perfectly diffused surface. The perfectly diffused surface is commonly called a Lamberitian distribution. If an incident surface and an upper surface have rotational symmetrical shapes, the incident surface and the upper surface still have rotational symmetrical shapes even if a light emitted from an LED is widely diffused.

Figure 15:
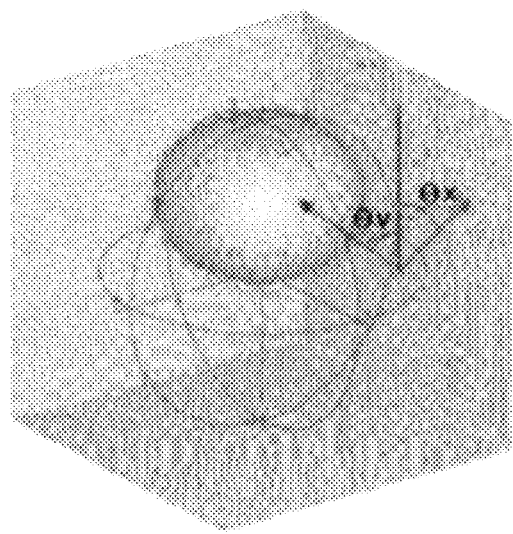
FIG. 15 is a schematic view illustrating a light distribution state of LED.

FIG. 15 is a schematic view illustrating a light distribution state of LED.

An optical intensity to ex direction and an optical intensity to θy direction are same when viewed from FIG. 15. However, when a light passes through an asymmetrical light diffusion lens, an asymmetrical light distribution shape is shown.

To be more specific, although an incident angle θ is same based on an optical axis of LED, when a light incident on an incident surface to an x direction (major axis direction) and a light incident on an incident surface to a y direction (minor axis direction) reach an incident surface, an incident angle on a first-reached refraction surface (incident surface) may differ. At this time, the standard is that a normal direction touched by a light becomes a reference axis, and an incident angle of light incoming to x direction when Ca>Cc may be greater than an incident angle of light incoming to a y direction. As a result, a light facing an x direction from an initially refracted incident surface has an asymmetrical light distribution because of being more relatively refracted than a light facing a y direction. Here, Ca is a curvature of incident surface sag profile to a major axis direction of light diffusion lens, and Cc is a curvature of an incident surface sag profile to a minor axis direction of light diffusion lens.

Figure 16:
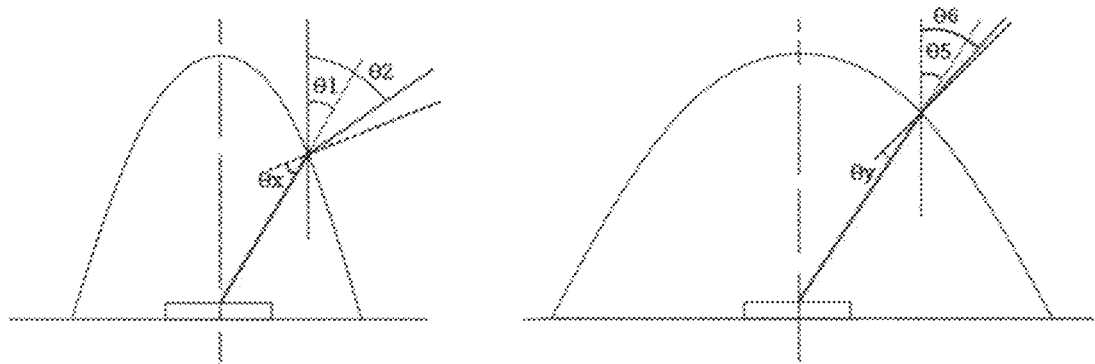
FIG. 16 is a schematic view illustrating a refracted state where lights that have respectively started at a same angle refract from an incident surface based on an LED emission.

FIG. 16 is a schematic view illustrating a refracted state where lights that have respectively started at a same angle refract from an incident surface based on an LED emission.

As noted from FIG. 16, even if a light starts with a same angle based on LED emission, an incident angle differs when reached the incident surface.

In the law of refraction, a refractive index of air n1=1, and a refractive index of PMMA or PC n2=1.49 (for PMMA) or 1.59 (for PC), an incident angle θx to an x direction and an incident angle θy to a y direction may be determined by a curvature Cs1 as shown in the conditional expression (1). Here, when Ca is a curvature of incident surface sag profile to a major axis direction of light diffusion lens, and Cc is a curvature of incident surface sag profile to a minor axis direction of light diffusion lens, an incident angle θx becomes θx>θ$_y$ to make a refractive angle relatively greater when Ca>Cc.

Figure 17:
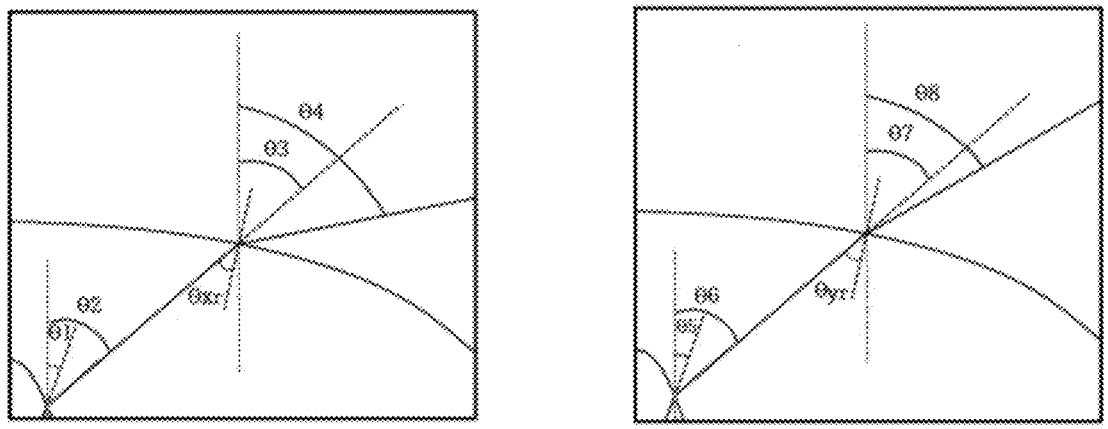
FIG. 17 is a schematic view illustrating a refracted state from an upper surface.

FIG. 17 is a schematic view illustrating a refracted state from an upper surface.

When it is assumed that incident angles are respectively θxr and θyr when a light reaches an upper surface under an incident surface condition of (Ca>Cc), the condition of θxr>θyr must be met in order to make a drastic asymmetrical light distribution. In order to satisfy the conditions, a curvature condition of upper surface must be (Cb<Cd), where, θxr: an incident angle when a light incoming by being refracted to an x direction reaches an upper surface, and θyr: an incident angle when a light incoming by being refracted to a y direction reaches an upper surface.

In order for an LED having a rotational symmetry to obtain an extreme asymmetrical light distribution shape, a curvature of each surface must be determined to allow having the following condition at all times at each point where lights (rays) emitted at a same angle from a light source to an arbitrary P point are refracted.

$$1.9 \geq \frac{\theta 4}{\theta 3} > \frac{\theta 8}{\theta 7} > \frac{\theta 2}{\theta 1} > \frac{\theta 6}{\theta 5} \geq 1 \quad \text{Conditional Expression (3)}$$

where,
θ1: incident angle of light incident on an incident surface from major axis direction (x axis direction) of light diffusion lens;
θ2: refractive angle of light refracted from an incident surface from major axis direction (x axis direction) of light diffusion lens;
θ3: incident angle of light incident on an upper surface from major axis direction (x axis direction) of light diffusion lens;
θ4: refractive angle of light refracted from an upper surface from major axis direction (x axis direction) of light diffusion lens;
θ5: incident angle of light incident on incident surface from minor axis direction (y axis direction) of light diffusion lens;
θ6: refractive angle of light refracted from incident surface from minor axis direction (y axis direction) of light diffusion lens;
θ7: incident angle of light incident on upper surface from minor axis direction (y axis direction) of light diffusion lens; and
θ8: refractive angle of light refracted from upper surface from minor axis direction (y axis direction) of light diffusion lens.

When the abovementioned ratio becomes greater, a ratio of light distribution that disperses after passing through the upper surface (100) may become greatly different, and when any one of the upper surface (100) and the incident surface (600) have a symmetrical structure (θ2/θ1=θ6/θ5 or θ4/θ3=θ8/θ7), the ratio of being asymmetrically emitted cannot but help being reduced due to limit of refractive ability of one side being reduced.

In order to satisfy the abovementioned conditions, the light diffusion lens (10) according to the present invention has a free curvature shape of anamorphic lens type to thereby disperse lights more broadly, and must have curvature characteristics of following conditions depending on directions of each cross-section: That is, when Ca>Cc,Cb<Cd,            Conditional Expression (4)

when Ca<Cc,Cb>Cd            Conditional Expression (5)

where,
Ca: curvature of incident surface sag profile to a major axis direction of light diffusion lens;
Cb: curvature of upper surface sag profile to a major axis direction of light diffusion lens;
Cc: curvature of incident surface sag profile to a minor axis direction of light diffusion lens; and
Cd: curvature of upper surface sag profile to a minor axis direction of light diffusion lens.

A direction where a curvature of an incident surface is great in a lens satisfying the above curvature conditions may be determined as a major axis direction.

Figure 18:
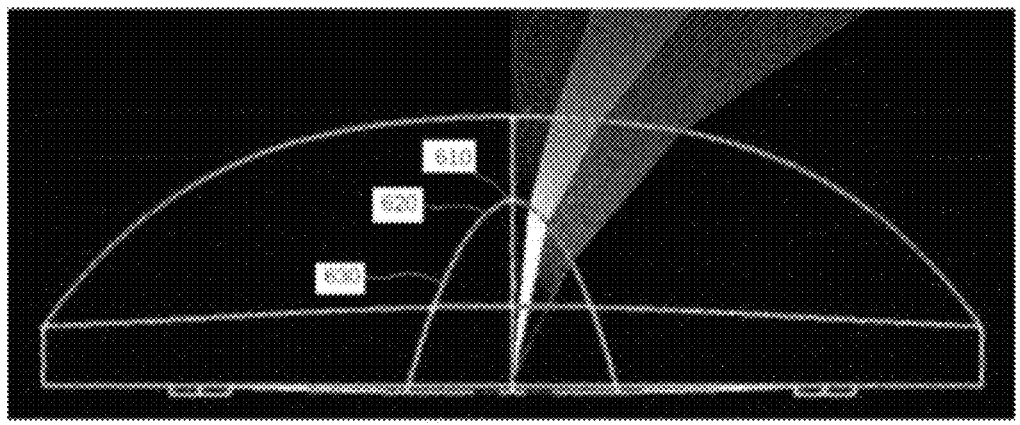
FIG. 18 is a schematic view illustrating a light diffusion effect by a light diffusion lens according to the present invention.

FIG. 18 is a schematic view illustrating a light diffusion effect by a light diffusion lens according to the present invention.

It can be noted from FIG. 18 that refractive angles incident through the first auxiliary incident surface (610) to the third auxiliary incident surface (630) are respectively different. This is because each of the first auxiliary incident surface (610) and the third auxiliary incident surface (630) has a mutually different curvature.

Meantime, a radius of curvature of first auxiliary incident surface (610) is smallest while a radius of curvature of third auxiliary incident surface (630) is the largest, whereby it can be learned that a refractive angle grows larger towards a surrounding area of light diffusion lens (10).

That is, it can be learned that a light emitted from the LED (300) is fully and sufficiently diffused to a surrounding area of light diffusion lens (10) and as a result, the hot spot phenomenon can be improved.

Meanwhile, a portion of lights about a central area among lights generated from an LED (300), particularly a portion of lights within a scope of 20° can be sent to an area where a darkness phenomenon is generated. As a result, it can be learned that the darkness phenomenon can be improved.

Figure 19:
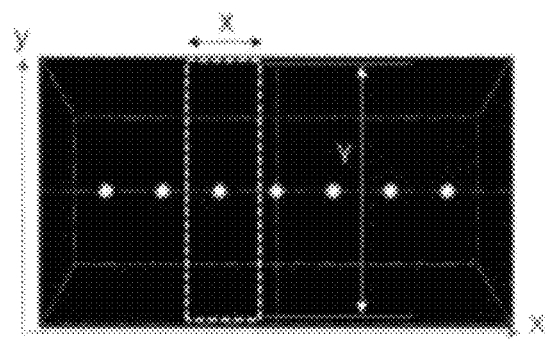
FIG. 19 is a schematic view illustrating an arrangement state of light diffusion lens in a backlight unit set.

FIG. 19 is a schematic view illustrating an arrangement state of light diffusion lens in a backlight unit set.

FIG. 19 illustrates an x axis irradiation area and a y axis irradiation area according to an arrangement state of light diffusion lens in a BLU (Backlight Unit) set, where it can be learned that seven (7) light diffusion lenses are arranged in series and the x axis irradiation area and the y axis irradiation area are mutually different.

Although no sensitivity is given to color mura because the x axis direction irradiation area is narrow in LED gaps due to BLU Set arrangement characteristics, the y axis direction irradiation area is very wide in LED gaps over the x axis direction irradiation area to be sensitive to the color mura. As a result, a color texture at the y axis direction is leaned toward a yellow side.

Figure 20:
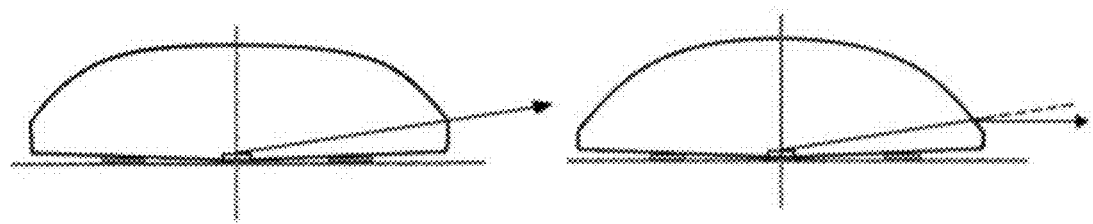
FIG. 20 is a schematic view illustrating a light refraction phenomenon by a lateral surface in a light diffusion lens according to the present invention.

FIG. 20 is a schematic view illustrating a light refraction phenomenon by a lateral surface in a light diffusion lens according to the present invention.

Referring to FIG. 20, a light can be more distantly diffused from a y axis relative to an axis by forming a lateral surface (120, 140) by providing a more curvature to a lower part on the y axis relative to a light incident on an area (corner area) where the upper surface (100) and the lateral surface (110, 130) meet on a cross-section to an x axis.

The corner area may be an area where yellow lights are more distributed. As a result, the yellow lights can be more distantly diffused on the y axis to thereby solve the problem of the color texture being leaned toward the yellow side.

As explained above, the light diffusion lens (10) according to the present invention can mitigate the color mura by differently designing the shape of light diffusion lens on the y axis direction.

Figure 21:
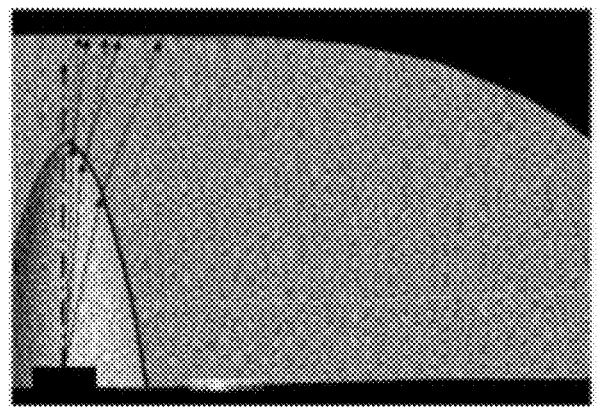
FIG. 21 is a schematic view illustrating a comparison of light distribution between light distribution lens according to the prior art and a light diffusion lens according to the present invention.
Figure 21:
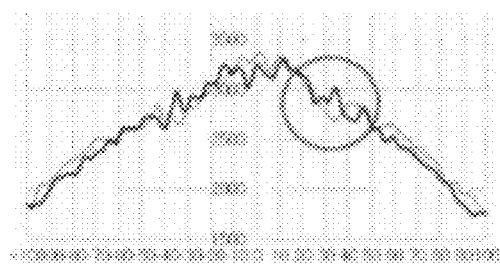

FIG. 21 is a schematic view illustrating a comparison of light distribution between light distribution lens according to the prior art and a light diffusion lens according to the present invention.

What is illustrated in dotted lines in FIG. 21 shows a light refraction and light strength distribution of a light diffusion lens using an incident surface of single curvature according to the prior art and what is illustrated in solid lines shows a light refraction and light strength distribution of a light diffusion lens using an incident surface (600) of multistage curvature according to the present invention.

Referring to an upper figure of FIG. 21, an incident surface (600) was formed that has inflection points defined by multistage curvature in order to improve the hot spot and darkness generated by a light facing to a zero (0) direction (optical axis direction) to a 20° direction (20° direction from the optical axis).

By the said incident surface (600), a light concentrated to zero (0) direction was diffused to a surrounding area where lights are relatively less distributed.

Referring to a lower figure of FIG. 21, it can be learned that the light strength distribution is smoothly and evenly changed at an area recognized as a darkness area illustrated by a circle, that is, it can be learned that the hot spot and the darkness have been improved.

Figure 22:
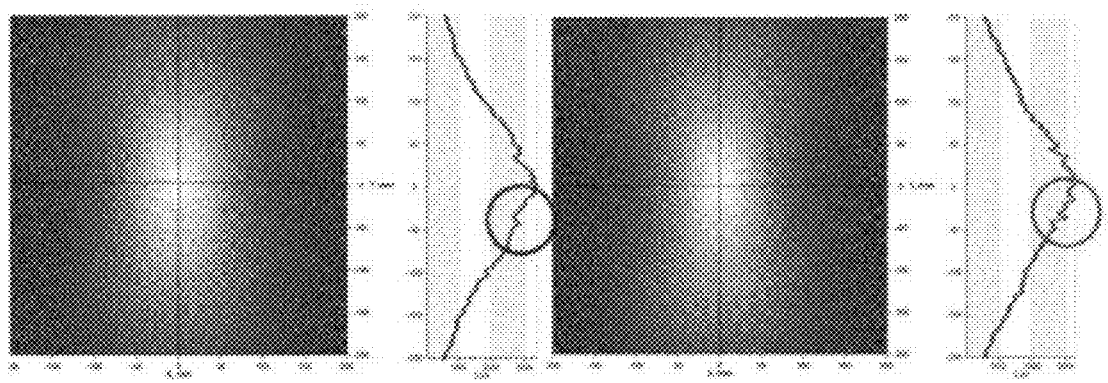
FIG. 22 is a schematic view illustrating a comparison of light distribution state and light strength distribution between a light diffusion lens according to the prior art and a light distribution lens according to the present invention.

FIG. 22 is a schematic view illustrating a comparison of light distribution state and light strength distribution between a light diffusion lens according to the prior art and a light distribution lens according to the present invention.

A left photo in FIG. 22 illustrates a light distribution state and light strength distribution of a light diffusion lens according to the prior art, and a right photo illustrates a light distribution state and light strength distribution of a light diffusion lens according to the present invention.

Referring to FIG. 22, it can be learned that the light strength distribution is smoothly and evenly changed at an area recognized as a darkness area illustrated by a circle, that is, it can be learned that the hot spot and the darkness have been improved.

Figure 23:
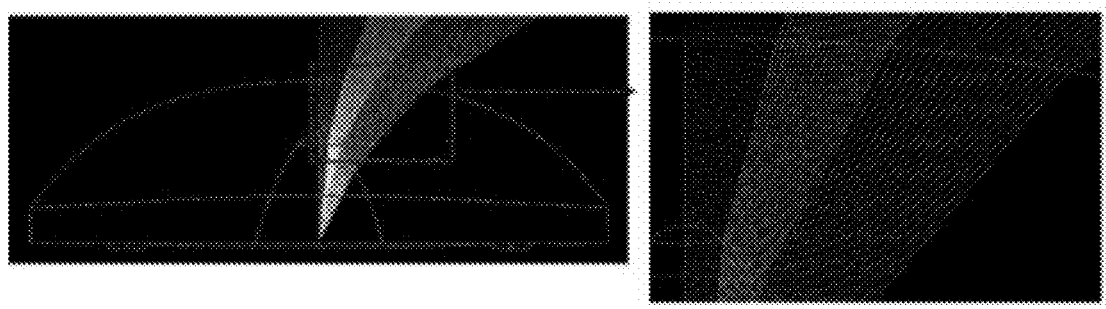
FIG. 23 is a schematic view illustrating a light diffusion action of a light diffusion lens according to the present invention.

FIG. 23 is a schematic view illustrating a light diffusion action of a light diffusion lens according to the present invention.

FIG. 23 illustrates a light refraction state within a light diffusion lens according to the present invention, where a left-side drawing is a schematic view enlarged with an underlined portion of a right-side drawing.

Referring to FIG. 23, an incident surface (600) was formed that has inflection points defined by multistage curvature in order to improve the hot spot and darkness generated by a light facing to a zero (0) direction (optical axis direction) to a 20° direction (20° direction from the optical axis).

By the said incident surface (600), it can be learned that a light concentrated to zero (0) direction was adjusted for each section and diffused to a surrounding area.

It can be learned that the hot spot has been improved by the configuration of FIG. 23. By the configuration of FIG. 23, a dark area can be improved from a light distribution formed by each light diffusion lens in a BLU set.

Figure 24:
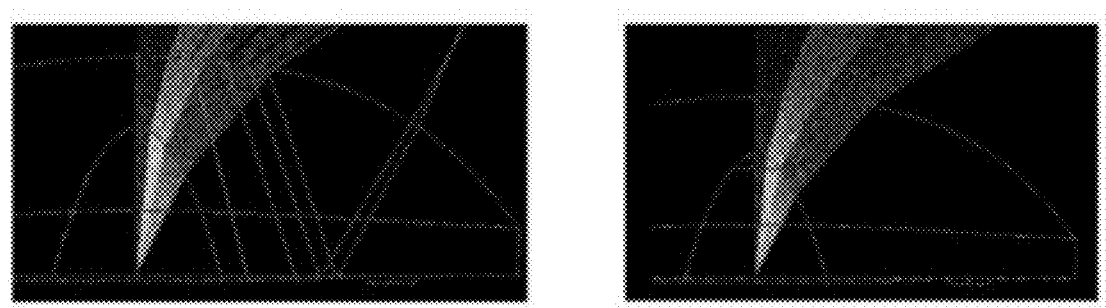
FIG. 24 is a schematic view illustrating a light distribution state according to applied number of stages of multi-staged curvatures.

FIG. 24 is a schematic view illustrating a light distribution state according to applied number of stages of multi-staged curvatures.

FIG. 24 is a schematic view illustrating a light path within a light diffusion lens. It can be learned from a drawing in the left side that a light path control is impossible and therefore, improvement was not realized due to the same radius of curvatures.

It can be learned from a drawing in the right side that a fine light path control is possible and therefore, improvement is being realized.

Figure 25:
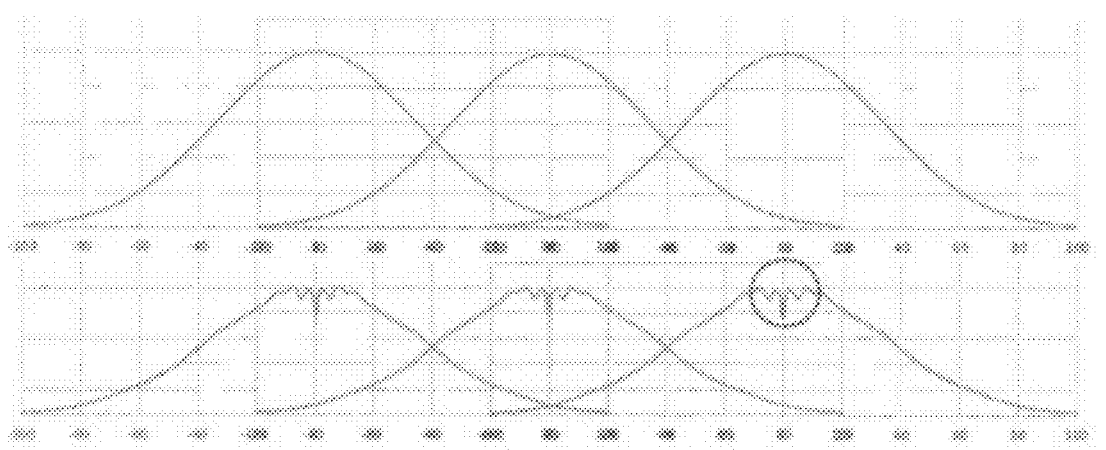
FIG. 25 is a schematic view illustrating a comparison between a case of curvatures to auxiliary incident surfaces being set at an optimal state and a case of being out of optimal state.

FIG. 25 is a schematic view illustrating a comparison between a case of curvatures to auxiliary incident surfaces being set at optimum and a case of being deviated from the optimum.

When a curvature to a plurality of auxiliary incident surfaces (610~630) is deviated from an optimum scope, and a darkness phenomenon can be rather greatly generated or screen quality can be resultantly degraded.

Here, the meaning of optimum defines that a light strength distribution by a light diffusion lens has an ideal Gaussian distribution.

When a light strength distribution by each light diffusion lens has an ideal Gaussian distribution, an image obtained by a liquid display may become clean free from mura phenomenon (free from darkness, hot spot and color separation).

When a light strength distribution by each light diffusion lens fails to have an ideal Gaussian distribution (e.g., twist at a central portion) an image obtained by a liquid display may be fraught with mura phenomenon (fraught with darkness, hot spot and color separation) because the central portion is unclean.

In order to obtain a light strength distribution having an ideal Gaussian distribution, it is necessary to adjust the refraction characteristics of incident surface (600) and refraction characteristics of upper surface (100).

INDUSTRIAL APPLICABILITY

The present invention relates to a light diffusion lens configured to evenly and asymmetrically diffuse a light generated from an LED, whereby a hot spot phenomenon and darkness phenomenon can be improved to thereby allow being industrially used.

What is claimed is:

1. A light diffusion lens diffusing a light generated from an LED, said lens comprising:
   a semi-spherical body formed with a glass material or a plastic material;
   an upper surface forming an upper outer shape of body;
   a lower surface forming a lower outer shape of body;
   an oval-shaped incident port formed at a center of lower surface to accommodate the LED; and
   an incident surface convexly formed from the incident port to an upper surface side,
   wherein
the incident surface has an apex disposed on an optical axis of LED, and a vertical cross-section of the incident surface is extended from the apex to the incident port to have a sag profile expressed by the following conditional expression:

$$z_1 = \frac{(c_{s1} r_{s1}^2)}{\left(1 + \sqrt{1-(1+k)\, c_{s1}^2 r_{s1}^2}\right)}$$

wherein
   z1 is a sag profile of incident surface;
   k is a conic constant;
   Cs1 is curvature expressed by 1/rs1, where, rs1 is a radius of curvature, and the incident surface includes a plurality of inflection points where the curvature Cs1 is changed;
and wherein the sag profile of the incident surface is a first sag profile, the plurality of inflection points make secondary sag profiles a difference of vertex heights of each sag profile of the first and secondary sag profiles is maximally less than 5 mm, when the number of inflection points is n, and there are sequentially formed along an incident port direction from an apex of incident surface with the inflection point as a border, a 1st incident surface having a sag profile in response to a first curvature to a nth incident surface having a sag profile in response to a nth curvature, and a n+1th incident surface having a sag profile in response to a n+1 curvature,
and wherein the incident surface is anisotropic where an incident surface sag profile to a minor axis direction of light diffusion lens is mutually different from an incident surface sag profile to a major axis direction of light diffusion lens, wherein, a curvature of the incident surface sag profile to a major axis direction of light diffusion lens is Ca, a curvature of the incident surface sag profile to a minor axis direction of light diffusion lens is Cc, and a ratio between Ca and Cc is more than 1.2.

2. The light diffusion lens of claim 1, wherein the upper surface has an apex disposed on an optical axis of LED, and a vertical cross-section of the upper surface is extended from the apex to an edge of lower surface and has a sag profile expressed by the following conditional expression:

$$z_2 = \frac{(c_{s2} r_{s2}^2)}{\left(1 + \sqrt{1-(1+k)\, c_{s2}^2 r_{s2}^2}\right)}$$

wherein
   z2 is a sag profile of upper surface,
   K is a conic constant,
   Cs2 is a curvature of 1/rs2, and
   rs2 is a radius of curvature.

3. The light diffusion lens of claim 2, wherein the conic constant k of upper surface sag profile z2 satisfies a condition of k<−1.

4. The light diffusion lens of claim 3, wherein the upper surface is anisotropic where an upper surface sag profile to a minor axis direction of light diffusion lens is mutually different from an upper surface sag profile to a major axis direction of light diffusion lens, and wherein a curvature of the upper surface sag profile to a major axis direction of light diffusion lens is Cb, a curvature of upper surface sag profile to a minor axis direction of light diffusion lens is Cd, and a ratio between Cb and Cd is more than 1.2.

5. The light diffusion lens of claim 4, wherein
   if Ca >Cc, then Cb<Cd, and
   if Ca<Cc, then Cb >Cd,
wherein
   Ca: curvature of incident surface sag profile to a major axis direction of light diffusion lens;
   Cb: curvature of upper surface sag profile to a major axis direction of light diffusion lens;
   Cc: curvature of incident surface sag profile to a minor axis direction of light diffusion lens; and
   Cd: curvature of upper surface sag profile to a minor axis direction of light diffusion lens.

6. The light diffusion lens of claim 2, wherein the minor axis/major axis direction of the light diffusion lens and the minor axis/major axis direction of the incident port are mutually different by 90°.

7. The light diffusion lens of claim 2, wherein the light diffusion lens satisfies the following conditional expression:

$$1.9 \geq \frac{\theta 4}{\theta 3} > \frac{\theta 8}{\theta 7} > \frac{\theta 2}{\theta 1} > \frac{\theta 6}{\theta 5} \geq 1$$

wherein
   θ1 is the incident angle of light incident on the incident surface from the major axis direction of the light diffusion lens;
   θ2 is the refractive angle of light refracted from the incident surface from the major axis direction of the light diffusion lens;
   θ3 is the incident angle of the light incident on the upper surface from the major axis direction of the light diffusion lens;
   θ4 is the refractive angle of the light refracted from the upper surface from the major axis direction of the light diffusion lens;
   θ5 is the incident angle of the light incident on the incident surface from the minor axis direction of the light diffusion lens;
   θ6 is the refractive angle of the light refracted from the incident surface from the minor axis direction of light diffusion lens;

θ7 is the incident angle of the light incident on the upper surface from the minor axis direction of the light diffusion lens; and θ8 is the refractive angle of the light refracted from the upper surface from the minor axis direction of the light diffusion lens.

\* \* \* \* \*